Figure 1:
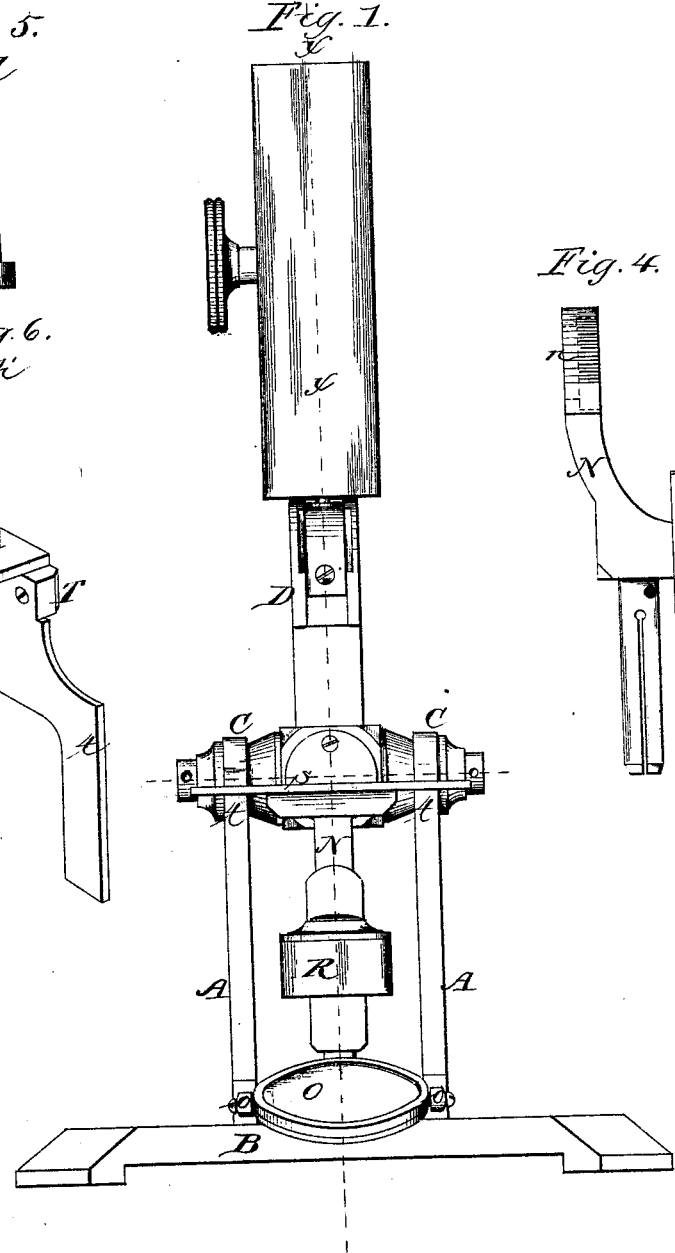

J. ZENTMAYER.
MICROSCOPES.

No. 181,120. Patented Aug. 15, 1876.

Witnesses
Jos. C. Fraley
Fred Sylvester

Inventor
Joseph Zentmayer

UNITED STATES PATENT OFFICE.

JOSEPH ZENTMAYER, OF PHILADELPHIA, PENNSYLVANIA.

IMPROVEMENT IN MICROSCOPES.

Specification forming part of Letters Patent No. 181,120, dated August 15, 1876; application filed July 11, 1876.

*To all whom it may concern:*

Be it known that I, JOSEPH ZENTMAYER, of the city of Philadelphia and State of Pennsylvania, have invented certain new and useful Improvements in Microscopes, of which the following is a specification:

My improvements consist, first, in a new mode of suspending and revolving the illuminating apparatus; second, in a peculiar construction of fastenings for the stage; and, third, in devices for perfecting the fine adjustment of the focus.

In the exceedingly delicate observations rendered possible by the perfection of modern lenses, it is in many cases absolutely essential to illuminate the object by light reflected upon it at a very oblique angle. This has been hitherto imperfectly done in various ways—viz., by the adjustment of prisms and lenses in different positions below the stage of the instrument; or by slightly shifting the axis of the achromatic condensers, which concentrate upon the object light reflected from a mirror beneath; or by interposing between the mirror and the object diaphragms of different shapes; or by suspending the mirror upon a stem pivoted below the stage, and swinging it to an angle on either side. The first of these is objectionable by reason of its cumbrousness, and the difficulty of making the proper adjustment, as well as from the costly nature of the apparatus. The second and third obtain obliquity of direction only by sacrificing the greater portion of the light, and are, moreover, so limited in range as to be of little value, and the fourth is imperfect from the fact that the axis of revolution of the mirror-stem is below the object under observation; and, hence, if the mirror be adjusted at an angle sufficiently oblique to be useful, the light reflected through the achromatic condenser falls considerably to one side of the object; or, if the condenser be removed, (and this, with high-power lenses, gives very unsatisfactory results,) it is necessary to readjust the focus of the mirror with every change of position, since the distance from the point to be illuminated varies with the angle of revolution.

Thus all these methods are exceedingly limited in the degree of obliquity of illumination which can be practically attained, and, furthermore, afford no means of recording their positions for future convenience, requiring an experimental adjustment on each occasion of their use.

By my improved mode, however, the degree of obliquity of illumination is practically unlimited. There is no sacrifice of intensity, and the operator is enabled to observe and record the exact position of the illuminating apparatus which gives the best result for any particular object. Moreover, by the peculiar construction of the stage-fastenings, the mechanical details are much simplified, and the stage can be readily removed or changed without disturbing the position of the illuminating apparatus.

Figures 2, 3:
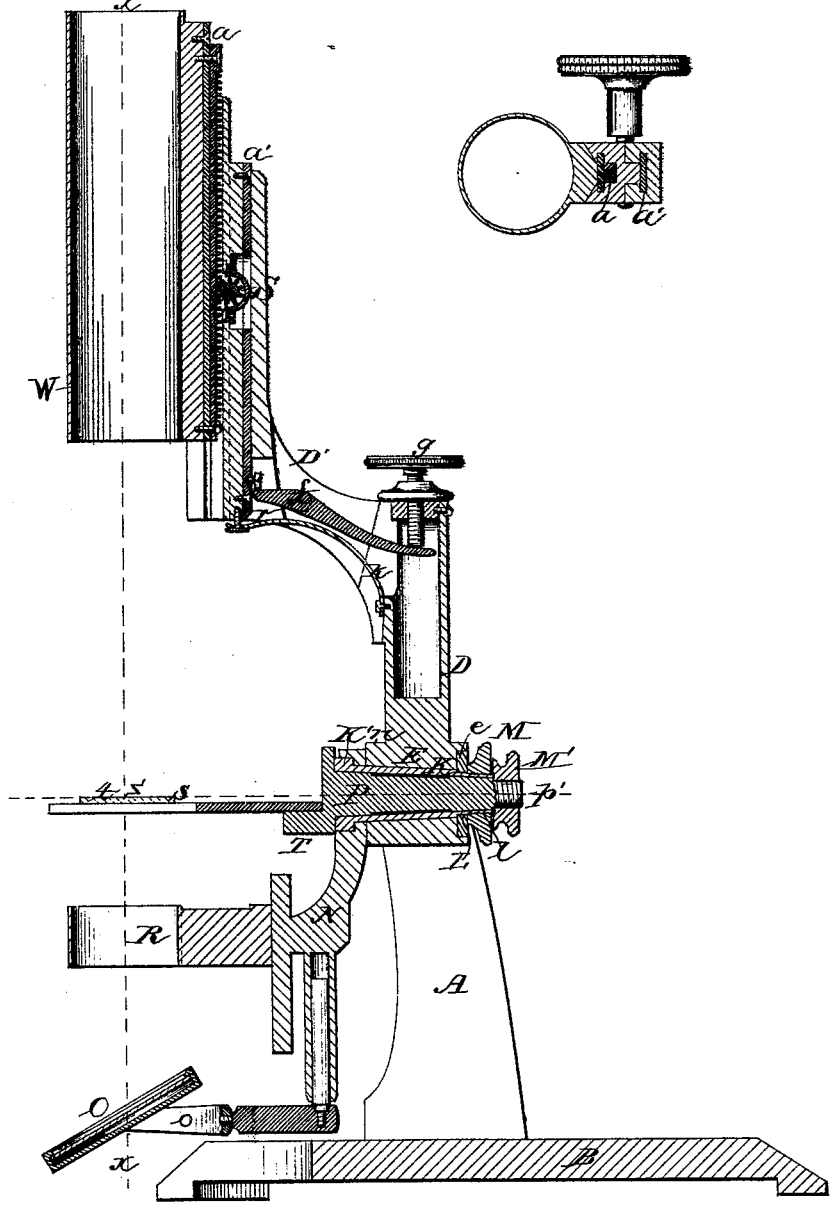

In the accompanying drawings, forming part of this specification, Figure 1 represents a front elevation of the microscope-stand, showing the mirror and its accessories in different positions; Fig. 2, a side elevation, in section, through the line $x\ x$ in Fig. 1. Fig. 3 is a cross-section through the body of the instrument, showing the arrangement of the coarse and fine adjustment. Figs. 4, 5, and 6 are details of the mirror-stem and stage with their fastenings.

Similar letters of reference indicate the same parts in all the figures.

A A are two uprights standing upon the ordinary tripod-base B, and having at their upper ends rests C C, in which the trunnions of the frame D D' are suspended, allowing the inclination of the instrument at any angle. The frame D D' is preferably of the form shown, supporting at its upper end the body, which is longitudinally adjusted by a device to be hereafter explained, and at its lower end projecting a short distance below the trunnions. The frame is perforated by a hole, E, whose axis is perpendicular to the optical axis of the body, (which latter is indicated by the line $x\ x$.) This hole is preferably made with a slight taper, as shown, and at the smaller end is fitted with a plate, $e$, which has a square aperture, forming a shoulder. A sleeve, K, having a flange, K', a square neck, L, and screw-thread $l$, fits closely into the hole of the frame, being prevented from turning by the square form of the aperture, and is held in position by a ring-shaped nut M. The mirror stem N, holding at its lower end the mirror O, and fitted with the usual secondary stage R, has at its upper end a circular collar, n, which fits around the projecting end of the sleeve K, and is countersunk to receive the flange K' of the sleeve. The nut M, being screwed up against the plate e, draws the sleeve into the hole of the frame, and in so doing holds the collar of the mirror-stem between the flange of the sleeve and the face of the frame with sufficient firmness to permit its revolution and to retain it at any inclination. The outer periphery of the collar is graduated with a scale, and by means of an index or mark at any convenient point the angle of adjustment can be read.

The secondary stage R, which slides up and down upon the mirror-stem, consists, essentially, of cylindrical or tubular fittings, to receive the different accessories, such as the achromatic condenser, polarizer, &c. The mirror O is supported at the lower extremity of the stem upon arms o o. These arms and the sliding support of the secondary stage are of such length that when the stem is parallel to the line $x$ $x$ the latter, if projected downward, would coincide with the axis of the achromatic condenser and strike the center of the mirror. A bar, P, also by preference tapering, as shown, with a screw-thread, $p'$, and a shoulder, $p$, which forms the rest for the stage, passes through the sleeve K and its nut M, and is retained in position by a second nut, M', which draws the shoulder $p$ against the flange of the sleeve, where it is locked in position by a projecting pin, $q$, inserted in a hole countersunk in the flange. This locking insures the stage being perpendicular to the optical axis $x$ $x$. Upon a right-angled projection, T, of the shoulder $p$ is fitted the stage $t$ $t$, which is of the usual construction, but of such height that the axis of the bar P, if prolonged, would intersect the optical axis $x$ $x$ at the point of the object under observation. As the glass slides $s$, upon which objects are usually mounted, vary in thickness but slightly, the flat top of the stage $t$ $t$ is lower than the axis of the bar P by the average thickness of a slide—say, about one-twentieth ($\frac{1}{20}$) of an inch. Since the axis of the bar P is coincident with the axis of revolution of the mirror-stem, it is obvious that at whatever angle the mirror-stem may be inclined, the axis of the tubular secondary stage, and of the condenser, will intersect the optical axis $x$ $x$ at the same point that the prolonged axis of the bar P does—viz., at $z$, the point of the object under observation—thus always insuring the concentration upon that point of the light reflected through the condenser, &c., by the mirror. The ordinary achromatic condenser being always provided with set-screws for slight lateral adjustment, these enable the operator to counterbalance the trifling variations in the thickness of the slides, so that the concentration of light upon the point of observation is practically perfect—a result which remains the same, whatever be the angle of the mirror-stem, and the consequent obliquity of the light.

The suspension of the mirror-stem by the collar $n$ permits the free revolution of the mirror and secondary stage in an almost complete circle, its range being only limited by the body of the instrument, and by means of the graduations upon the collar the position which gives the best light for any particular object can be readily noted.

The construction of the stage-supports with the bar P, adjusted by its independent nut, enables the operator to shift and replace the stage without disturbing the position of the mirror-stem.

It is obvious, however, that this form of stage-fastening has no necessary relation to the improved mode of suspending and revolving the mirror and secondary stage, which latter may be effected by any device equivalent to the collar $n$, provided the axis of revolution be a line which, if projected, will intersect the optical axis $x$ $x$ of the body at a point in the plane of the object-slide, so that the mirror and secondary stage describe an arc whose center is substantially the point $z$ of the object under observation.

The third feature of my improvements consists in the fine adjustment. The coarse adjustment is effected in the usual manner, known as "Jackson's principle"—viz., a longitudinal slide, $a$, fixed close to the body, and worked by a rack and pinion, S. To perfect the fine adjustment I use in connection with these a secondary slide, $a'$, parallel to the first, and carrying the first together with its adjusting mechanism. In the projecting arm D' of the frame a slotted cavity is provided large enough to receive a lever, whose fulcrum is at $f$, and whose short arm $r$ rests in a slot on the under side of the secondary slide. The long arm of the lever extends backward through the frame, and receives the end of a micrometer-screw, $g$, by which it is depressed, thus elevating the secondary slide, and with it the coarse adjustment and the body. In order to produce a contrary movement I provide a light spring, $k$, which, by constantly pressing downward upon the other side of the slot in the secondary slide, moves it in that direction as soon as the pressure of the micrometer-screw upon the lever is released. Hitherto it has been usual to effect the fine adjustment by mounting a screw and lever at the point W, and by it to elevate or depress a short nose-piece in the lower end of the body, carrying the lenses; but, in practice, this is liable to frequent derangements, owing to the shortness of the sliding nose-piece and the exposed position of the screw. The long secondary slide will not work loose, and by placing it and the adjusting mechanism on the under side of the body great steadiness is attained.

I claim—

1. The swinging mirror-stem, carrying the mirror and its accessories, and having for its axis of revolution a line which intersects the optical axis $x\,x$ of the body at a point in the plane of the object-slide, substantially as described and shown.

2. The combination of the mirror-stem and its collar with the flanged sleeve and nut, substantially as described and shown.

3. The combination of the shouldered bar P, supporting the stage, with the flanged sleeve and independent nut M', substantially as described and shown.

4. The combination of the secondary slide with the screw and lever, or their equivalent.

5. The combination of the secondary slide with the spring $k$, or its equivalent.

JOSEPH ZENTMAYER.

Witnesses:
   JOS. C. FRALEY,
   FRED. SYLVESTER.